United States Patent [19]

Koronkiewicz

[11] 4,398,500

[45] Aug. 16, 1983

[54] LOCKING ANIMAL COLLAR

[76] Inventor: Henry L. Koronkiewicz, 186 Queens Ave., Toronto, Ontario, Canada, M8V 2N9

[21] Appl. No.: 351,525

[22] Filed: Feb. 23, 1982

[51] Int. Cl.³ .............................................. A01K 27/00
[52] U.S. Cl. ..................................................... 119/109
[58] Field of Search .................... 119/109, 106; 70/16, 70/18

[56] References Cited

U.S. PATENT DOCUMENTS

| | | | |
|---|---|---|---|
| 1,410,802 | 3/1922 | Foster | 70/16 |
| 2,759,349 | 8/1956 | McKee | 70/16 |
| 3,867,905 | 2/1975 | Vail, Jr. | 119/109 |
| 3,875,771 | 4/1975 | Reisner | 70/18 |

Primary Examiner—Hugh R. Chamblee

[57] ABSTRACT

The present invention provides an animal leash having first and second loop forming portions at either end thereof with one of the loop forming portions comprising an adjustable collar. The leash further includes a locking arrangement for locking the collar at different loop sizes. The locking arrangement itself comprises recesses in the collar, a housing for slideably receiving the collar, a lug within the housing for fitting into the recesses when the collar is locked and a rotatable lock member for effecting locking and unlocking of the collar.

14 Claims, 11 Drawing Figures

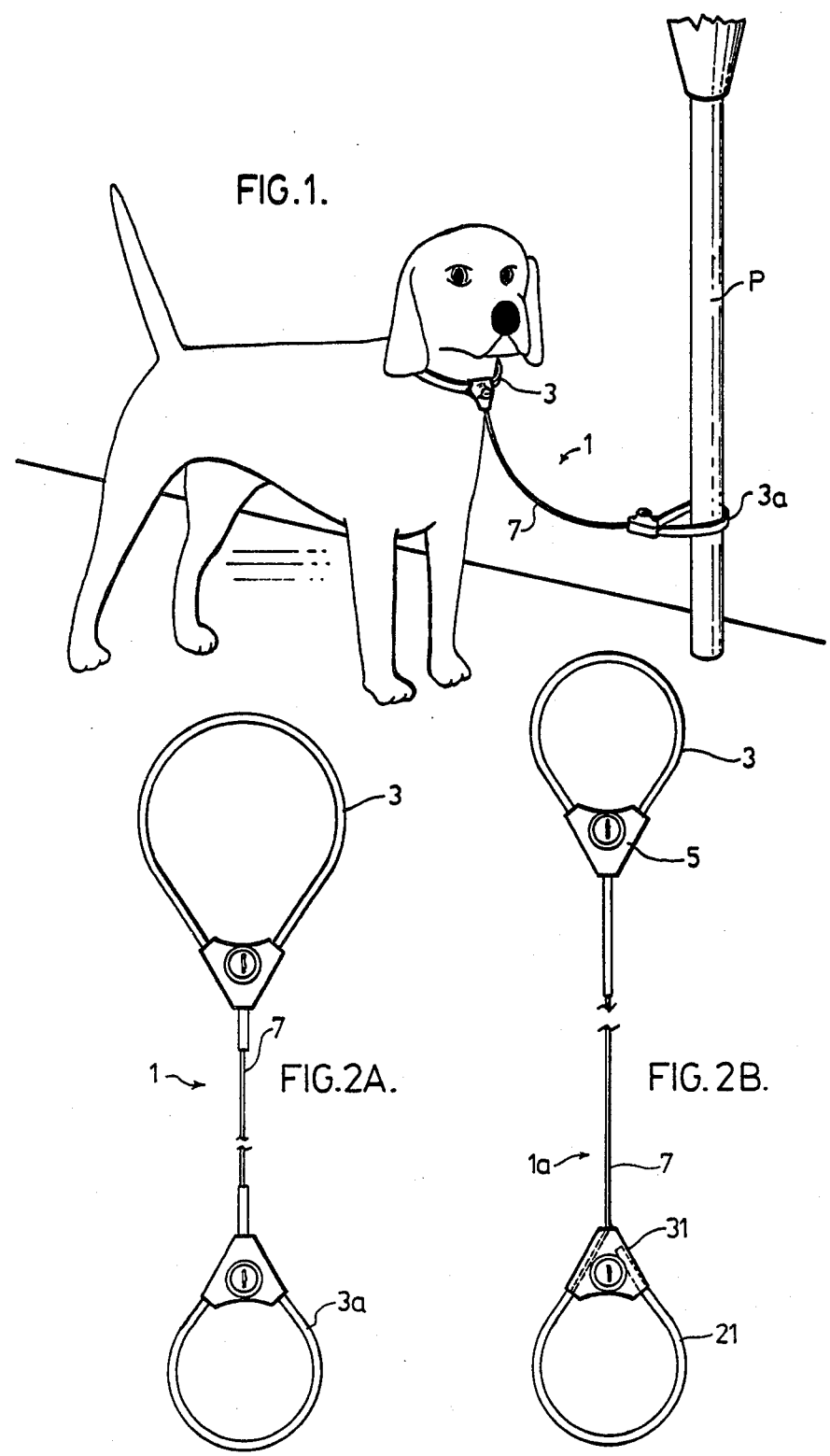

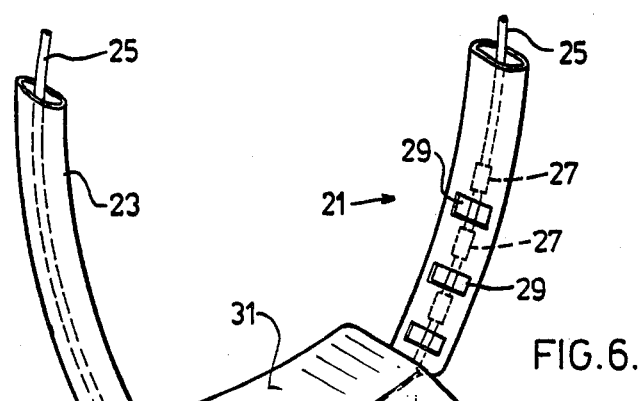
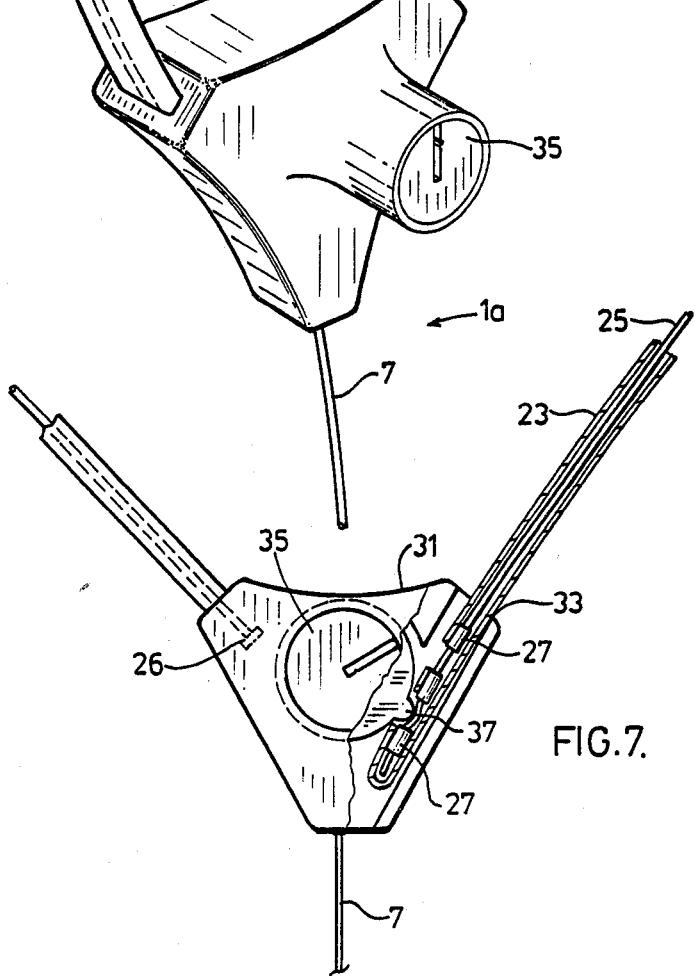
FIG. 6.
FIG. 7.

LOCKING ANIMAL COLLAR

FIELD OF THE INVENTION

The present invention relates to an animal leash having locking loop forming portions at either end of the leash with at least one of the loop forming portions being adjustable to different loop sizes. Accordingly the leash can be used on different sizes of animals at one end and can be fastened by its other end to an object such as a post or the like for reducing the likelihood of theft of the animal.

BACKGROUND OF THE INVENTION

Recently many people have been acquiring pets such as dogs and cats for companionship. These pets come in all shapes and sizes ranging from extremely large dogs to much smaller animals such as cats and the like. All of these pets generally require outdoor activity which may be in the form of a walk at the end of a leash. For example, many people will walk their dog to the local supermarket and then chain the dog outside of the store while they are inside shopping.

Unfortunately there has been a recent rash of animal thefts where the animals are stolen for ransom, breeding, etc. These thefts are quite agonizing both from an emotional and a financial standpoint. Therefore it is important that a deterrent to animal stealing should be developed. Preferably the deterrent should be relatively uncomplicated, low in cost and of universal nature in that it can be used with essentially any size of animal.

SUMMARY OF THE PRESENT INVENTION

The present invention provides an animal leash adapted to reduce the number of thefts of animals left unattended outside. More particularly the leash includes first and second loop forming portions, one at either end of the leash. At least the first loop forming portion comprises a collar which is adjustable, to different loop sizes and includes a locking arrangement for locking the collar at the different loop sizes. The locking arrangement comprises adjustment recesses in the collar, a housing for slideably receiving the collar, lug means within the housing for fitting into the recesses when the collar is locked and a rotatable lock member moveable from a locking position for forcing the fitting of the lug means into the recesses to an unlocking position for withdrawal of the lug means from the recesses to allow adjustment of the collar. The leash further includes locking means to additionally lock the second loop forming portion for securing an animal locked into the collar portion to a post or the like. Preferrably the entire leash is made from a material such as tempered steel which cannot be readily cut by standard wire clippers.

BRIEF DESCRIPTION OF THE DRAWINGS

The above as well as other advantages and features of the present invention will be described in greater detail according to the preferred embodiments in which:

FIG. 1 shows in perspective a dog secured to a post by means of a locking animal leash according to one embodiment of the present invention;

FIGS. 2a and 2b are plan views showing two different types of locking animal leashes according to alternate preferred embodiments of the present invention;

FIG. 6 shows in perspective a further preferred locking collar arrangement according to an aspect of the present invention;

FIG. 7 is a plan view showing the internal locking of the arrangement shown in FIG. 6;

DETAILED DESCRIPTION ACCORDING TO PREFERRED EMBODIMENTS

As shown in FIG. 1 a dog is secured to a post P as found on a parking meter by means of a locking animal leash generally indicated at 1. This particular leash which is shown in FIG. 2a, includes a pair of loop forming portions 3 and 3a of different sizes but otherwise identical in construction. Either one of these loop forming portions may be used as a collar depending upon the size of the animal secured by the leash. Each of the loop forming portions is adjustable to different loop sizes thereby adapting the leash to use with essentially any animal which would be walked on a leash regardless of the animal size.

The essence of the present invention resides in the feature that each of these loop forming portions is set up for locking in a closed loop configuration as shown in FIG. 1 whereby the dog secured by the leash is substantially protected against theft which might otherwise occur by either removing the collar from the dog or by attempting to remove the loop 3a from the post p which has a meter at its upper end to prevent the loop from being slid off of the post.

Figures 3, 4:
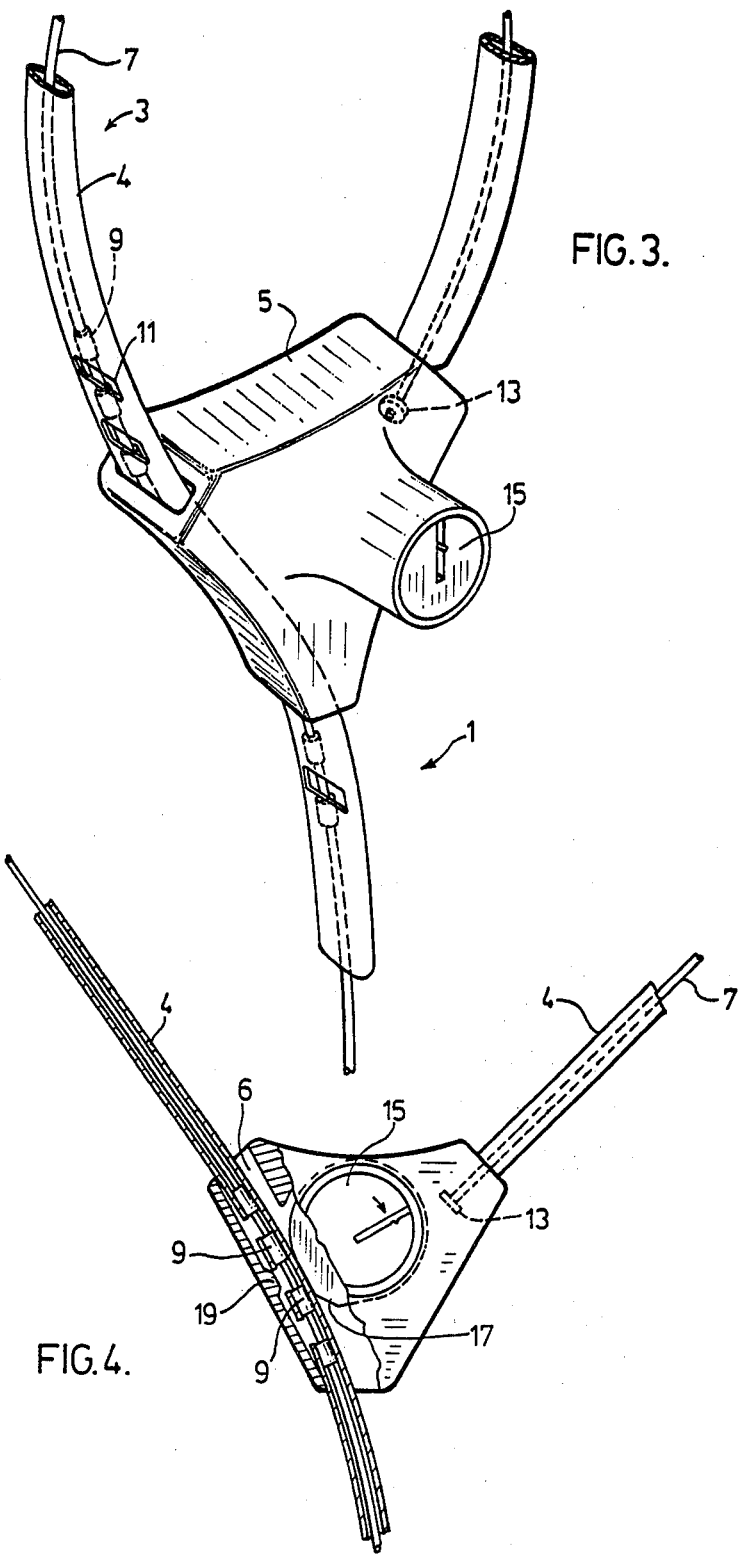
FIG. 3 is an enlarged perspective view of one of the loop forming portions shown in the leash of FIG. 2.
FIG. 4 is a plan view showing the interior locking of the collar shown in FIG. 3.
Figure 5:
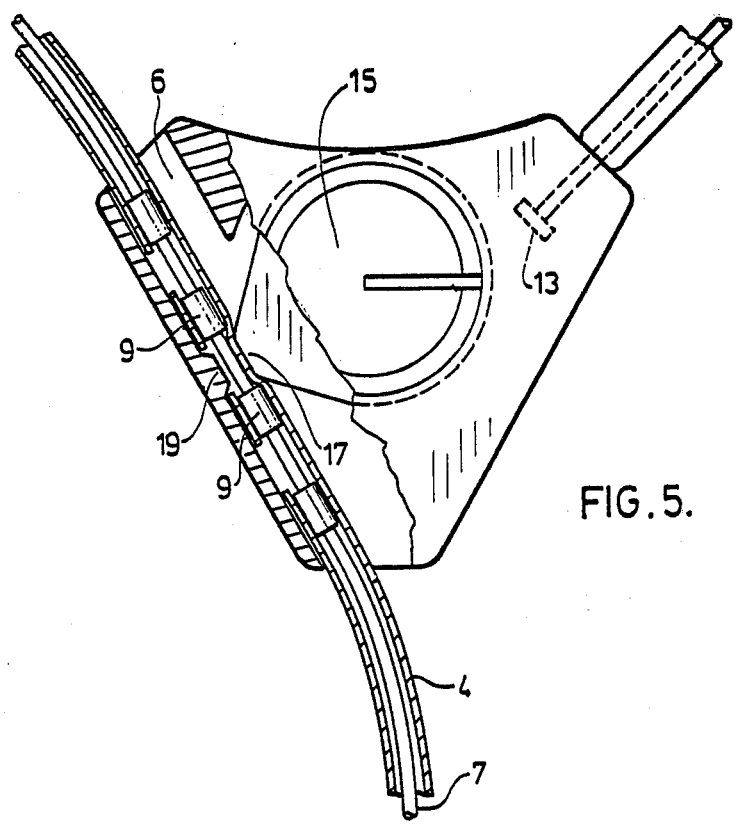
FIG. 5 is an enlarged plan view of the arrangement shown in FIG. 4.

Referring more particularly to FIGS. 3 through 5, loop forming portion 3 includes a cable 7 which runs the entire length of the leash and in fact extends through the loop forming portion 3a. This cable is preferably made from a tempered steel which is extremely resistent to cutting as a further prevention to animal theft. In the loop forming portion 3 cable 7 is provided with a plurality of spaced apart protrusions 9 fixed directly to the cable and covered by means of a sheath 4. This sheath is formed from a softened material such as leather or the like to provide comfort around the neck of the animal. Provided in the sheath are a plurality of recesses 11 between the cylindrical protrusions 9 on the cable which are used for adjusting the loop size of the collar.

A housing 5 is provided at the collar of the leash. On one side of the collar the end 13 of cable 7 is permanently secured in housing 5 while the other side of the collar is slideable through a slotted opening 6 in the housing. This slotted opening allows the loop to be adjusted to different animal neck sizes while the inside of the housing portion is provided with means for locking the collar at these different sizes. This particular locking means comprises a fixed lug 19, and a rotatable lock member 15 provided with a cam portion 17; shown in the unlocking position in FIG. 4 and the locking position in FIG. 5.

In the unlocking position lock member 15 is rotated such that cam portion 17 is away from the sheath of the collar thereby creating a substantial gap between the lock member and lug 19. This gap allows the collar to be pulled away from the lug for sliding the collar within the slot 6 to the desired loop size. Once the adjustment has been made, lock member 15 is then turned to the FIG. 5 position where it pushes on the sheath of the collar forcing the collar to move toward lug 19 which fits through the appropriate opening or recess 11 in the sheath between two of the cylindrical protrusions 9. In this position the collar cannot be adjusted due to the interference between the cylindrical protrusions on the cable and lug 19.

This particular arrangement has the benefit that all of the adjustment is taken up in the intermediate portion of the leash between the collars 3 and 3a. Accordingly there is no excess material hanging to either side of the collar. This is in contrast to loop forming portion 21 as found in FIGS. 2b, 6 and 7 in which all of the adjustment is taken up at the loop forming portion without affecting the length of the leash itself. This particular arrangement has the benefit that the loop can actually be opened to allow it to be fitted around a fence post or the like where the top of the post is closed off and does not allow the loop to be slipped over the post and then tightened in position as is the case in FIG. 1.

Loop forming portion 21 also has a somewhat different locking arrangement from the arrangement described above although its principle of operation is essentially the same. As shown in FIG. 6 loop forming portion 21 includes a cable 25 permanently secured at its end 26 within housing 31. The cable is provided at the other side of the loop with a plurality of cylindrical bodies 27 fitted directly to the cable and covered by means of a sheath 23. The sheath is provided with openings 29 on the inside of the collar between the cylindrical bodies 27. This sheath which is again made of a softened material ensures a comfortable fit around the animal's neck while covering the abrupt locking edges of the cylindrical bodies 27.

The cable with its covering sheath both fit within a slotted opening 33 to one side of housing 31 which allows sliding of the loop forming portion to different loop sizes. Located centrally of the housing is a rotatable lock member 35 having a tooth 37. When this tooth is away from the locking position the cable and its sheath are easily withdrawn from the housing for opening the loop to wrap it around a fence post or the like. The cable and sheath can then be fitted back into the slotted opening to close the loop and locked in position by rotating lock member 35 whereby tooth 37 fits through any one of the openings 29 in the sheath to lock between adjacent cylindrical bodies 27 on cable 25.

Figure 8:
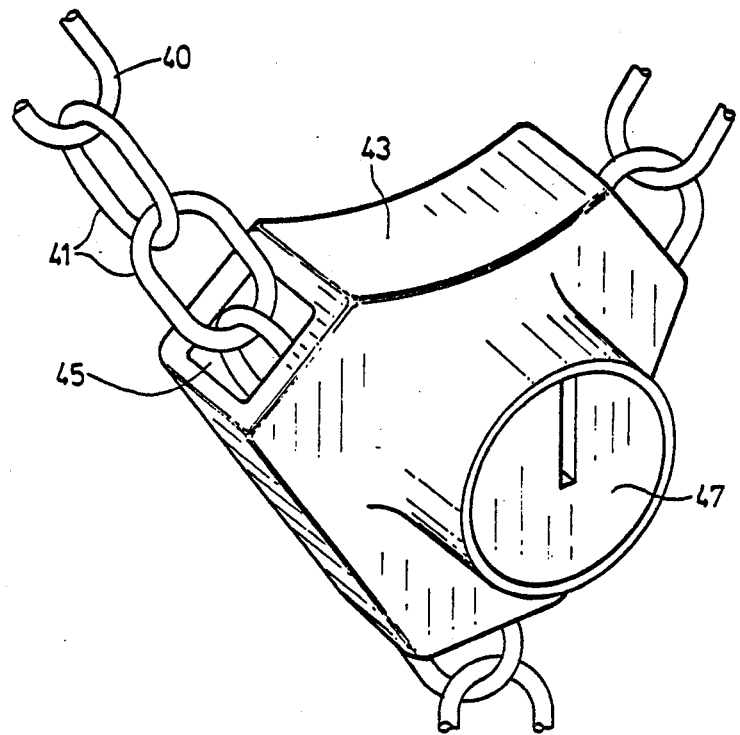
FIG. 8 is a perspective view of an alternate form of a loop forming and locking arrangement according to a further preferred embodiment of the present invention.
Figure 9:
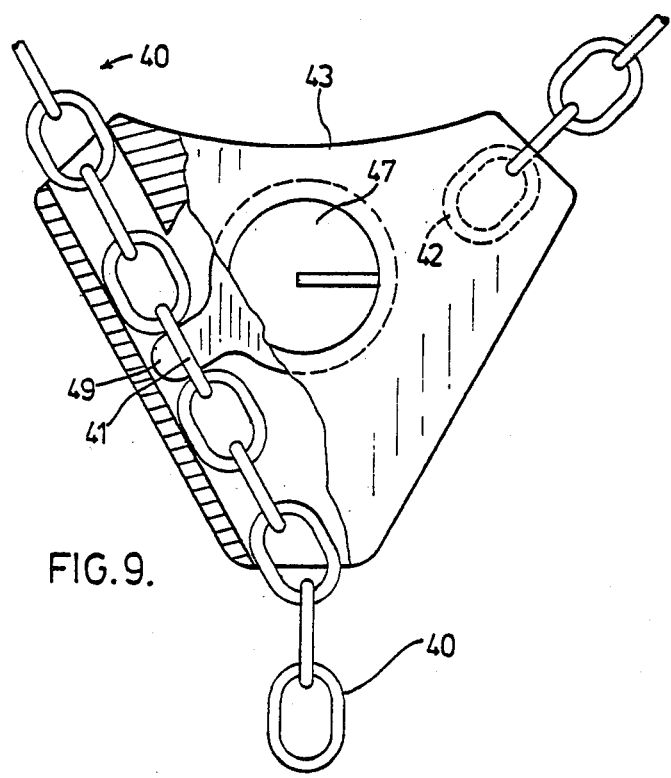
FIG. 9 is a plan view of the internal structure of the arrangement shown in FIG. 8.
Figure 10:
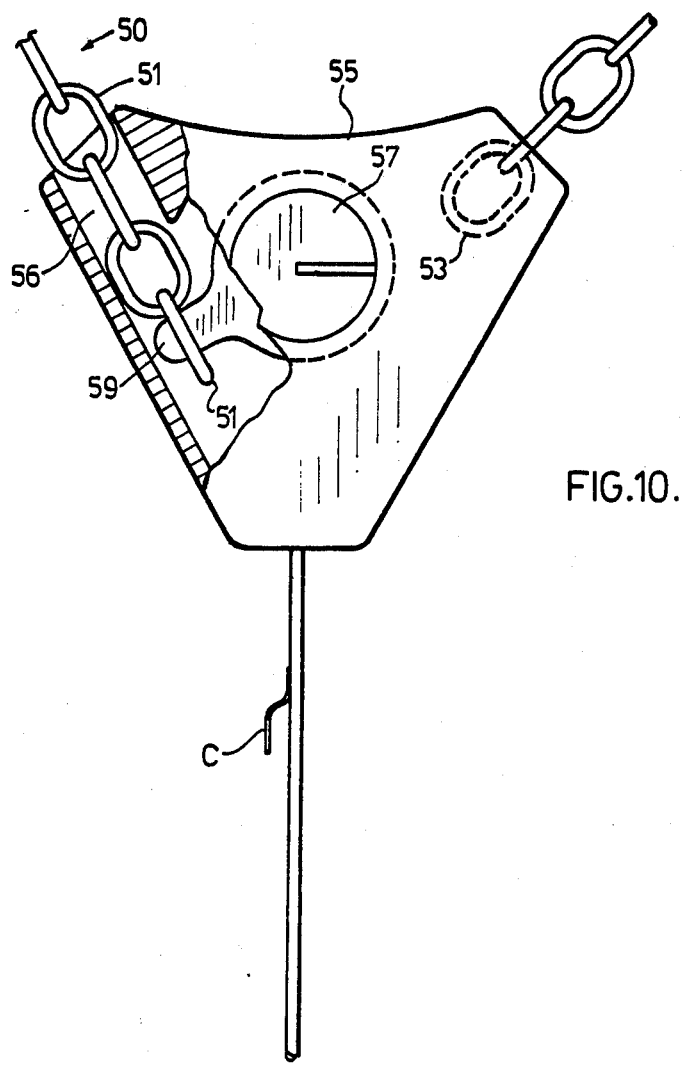
FIG. 10 is an internal plan view of a slightly modified arrangement from that shown in FIGS. 8 and 9.

Each of the embodiments described above relates to an internal cable provided with roughened protrusions which must be covered by means of a protective sheath for comfort around the animal's neck. Openings are then provided in the sheath to form locking recesses between the protrusions on the cable. FIGS. 8, 9 and 10 on the other hand show an arrangement in which the collar is formed from a chain such as that found on a standard choke collar. The links in this chain have a generally smooth surface so that they are still relatively comfortable on the animal.

According to the FIGS. 8 and 9 arrangement the adjustable collar is formed from a chain 40 comprising a plurality of open links 41. This chain is secured at its terminal end 42 within a housing 43. The chain is adjustable at the other side of the housing within a slotted opening 45 through which the chain slides when it is unlocked. Provided centrally of the housing is a rotatable lock member 47 bearing a tooth 49 which when the rotatable lock member is moved to a locking position engages in the appropriate chain link to lock the collar at its adjusted size. When the rotatable lock member is rotated to the unlocking position the tooth is moved out of the link allowing the chain to slide freely. As will again be seen in this particular embodiment, all adjustment of the collar is taken up directly in the length of the leash itself.

The FIG. 10 arrangement is one in which the collar is again formed from a chain generally indicated at 50. However, unlike the FIG. 8 and 9 arrangement this chain which is formed of open links 51 and secured at one end 53 within a housing 55 is set up to open completely when in the unlocked position. The chain is slideably received within slot 56 of housing 55 and locked in the closed position by means of a rotatable lock member 57 provided with tooth 59 for engaging any one of the links in the chain according to the desired size of the loop required to properly fit about the animal's neck. With this arrangement the intermediate portion of the leash comprises a cylindrical cable 61 which is not adjustable in length and which is permanently secured to the housing 55. With this arrangement a clip C is provided directly on cable 61 for securing any excess chain that would hang past housing 55 when the collar is adjusted for a small animal.

As will be seen from all of the embodiments described above the locking animal leash of the present invention is extremely easy to work with and yet very effective against animal thefts which might otherwise be accomplished by either releasing the collar from the animal or by simply untieing the leash from its retaining post. Furthermore the animal leash of the present invention is arranged with very substantial adjustability for comfortably fitting and locking on a variety of different sizes of animals. However it should be noted that the embodiments of FIGS. 3 and 8 described above do not have to be locked and can be used when in the unlocked position as a choke collar for animal training purposes.

Although various preferred embodiments of the invention have been described herein in detail it will be appreciated by those skilled in the art that variations may be made thereto without departing from the spirit of the invention or the scope of the appended claims.

The embodiments of the invention in which an exclusive property or privilege is claimed are defined as follows:

1. An animal leash having first and second deformable loop forming portions at either end thereof, said first loop forming portion comprising a collar which is adjustable to different loop sizes, a locking arrangement for locking said collar at the different loop sizes, said locking arrangement comprising adjustment recesses in said collar, a housing for slideably receiving said collar, lug means within said housing for fitting into said recesses when the collar is locked, and a rotatable lock member moveable from a locking position for forcing the fitting of said lug means into said recesses to an unlocking position for withdrawal of said lug means from said recesses to allow adjustment of said collar; and locking means to additionally and releasably lock said second loop forming portion for opening and closing thereof to secure an animal locked in said collar portion to a post and the like.

2. An animal leash as claimed in claim 1 wherein both of said first and second loop forming portions are adjustable in forming loops of different sizes.

3. An animal leash as claimed in claim 1 wherein said first loop forming portion has a substantially flat inner surface for comfort on an animal.

4. An animal leash as claimed in claim 1 wherein said collar comprises in inner cable provided with spaced apart protrusions and a sheath over said cable, said sheath being perforated between said protrusions to provide said recesses.

5. An animal leash as claimed in claim 4 wherein said lug means are provided on said housing in a stationary position, said rotatable lock member being provided with a cam which pushes on said collar when said rotatable lock member is in said locking position to force said collar to move to said lug means which engages in said recesses.

6. An animal leash as claimed in claim 4 wherein said recesses are located on an inner surface of said sheath, said rotatable lock member being located adjacent said inner surface of said sheath and carrying said lug means which moves with said lock member to provide locking and unlocking of said collar.

7. An animal leash as claimed in claims 4, 5 or 6 wherein said sheath is made from a soft flexible material such as leather and the like.

8. An animal leash as claimed in claim 1 wherein said leash and at least said first loop forming portion are formed from a continuous length of chain having interconnected chain links, said chain links being open to receive said lug means thereby providing said recesses.

9. An animal leash as claimed in claim 8 wherein said rotatable lock member includes a tooth which engages and disengages said chain with rotation of said lock member.

10. An animal leash as claimed in claims 8 or 9 wherein said second loop forming portion is also formed from said continuous length of chain.

11. An animal leash as claimed in claim 1 wherein said collar includes a leash connected end from which said collar is adjusted and a fixed end secured to said housing.

12. An animal leash as claimed in claim 1 wherein at least one of said first and second loop forming portions includes an end which is releasably secured at said housing for opening and closing such loop forming portion.

13. An animal leash as claimed in claims 1, 2 or 3 wherein said leash is formed from tempered steel.

14. An animal leash as claimed in claim 12 including clip means on said leash for clipping any excess length of collar fitted through said housing.

* * * * *